Dec. 29, 1964  L. HORN ETAL  3,163,374
METHOD OF AND APPARATUS FOR THE MANUFACTURE
OF CONDENSERS AND ELECTRODES FOR CELLS
IN STORAGE BATTERIES AND THE LIKE

Filed April 28, 1960  2 Sheets-Sheet 1

INVENTORS
LUTZ HORN
FRITZ PHILIPP
BY Michael S. Striker
ATTORNEY

INVENTORS
LUTZ HORN
FRITZ PHILIPP
BY Michael S. Striker

ATTORNEY

United States Patent Office 3,163,374
Patented Dec. 29, 1964

3,163,374
METHOD OF AND APPARATUS FOR THE MANUFACTURE OF CONDENSERS AND ELECTRODES FOR CELLS IN STORAGE BATTERIES AND THE LIKE
Lutz Horn and Fritz Philipp, Hagen, Westphalia, Germany, assignors to Varta Aktiengesellschaft
Filed Apr. 28, 1960, Ser. No. 25,367
3 Claims. (Cl. 242—56.1)

The present invention relates to a method of and to an apparatus for the manufacture of multi-layer electrical condensers and of multi-layer electrodes such as may be utilized in the cells of electric storage batteries.

It is already known to manufacture electrical condensers or electrodes for electric cells by simultaneously winding a series of layers into a helical multi-layer package. The electrodes for the cells of storage batteries and the condenser foils are highly sensitive to tension and to mechanical damage; therefore, even today, the winding operation is performed mostly by hand or by hand-operated winding or reeling machines. A serious disadvantage of machines presently utilized for such purposes is that the distance between the anode and cathode layers is seldom uniform because the convolutions cannot be maintained under constant tension. An additional drawback of such machines is that occasional formation of folds or buckling of plates and the inclusion of air pockets cannot be avoided. The diameters of hand-convoluted multi-layer condensers or electrodes are seldom uniform which, in turn, presents a serious problem when the packages are inserted into the customary cartridges. As is known, it is highly desirable that a multi-layer condenser or electrode be formed with layers of very large areas and, consequently, the layers are normally tightly compressed during winding so that a cartridge may accommodate a multi-layer package which consists of a very large number of convolutions. If the convolutions are not applied uniformly, and if the diameters of consecutively produced hand-convoluted packages differ from each other, the outer layer of a larger-diameter package is frequently damaged during insertion into a standard cartridge which results in short-circuiting of the condenser or electrode and renders the product worthless. At best, the capacity of a cell containing a defective electrode is greatly reduced if one or more of its layers are damaged during insertion into the cartridge.

Certain of the above outlined drawbacks may be overcome by winding the multi-layer electrodes or condensers onto a core of comparatively large diameter. In order to attain a uniformity of tension in each consecutive convolution, i.e. in order to avoid undesirable variations in the distance between the adjacent layers during insertion into the cartridge, the core normally remains in the fully assembled package to occupy a comparatively large area of the overall space alloted for accommodation of convoluted layers. Thus, a permanently installed core occupies an area in the interior of the cartridge in which the electrochemical process should take place and thereby adversely influences the volume-capacity and the weight-capacity ratios.

An important object of the present invention is to provide a multi-layer condenser or electrode with an improved volume-capacity and weight-capacity ratio.

Another object of the invention is to provide an improved method of rapidly, conveniently and accurately assembling multi-layer condensers and electrodes for electric cells in storage batteries and the like.

A further object of the instant invention is to provide a fully automatic condenser and electrode winding apparatus.

An additional object of the invention is to provide an apparatus of the above outlined characteristics which is capable of assembling condensers or electrodes in such a way that the distance between the adjacent layers remains uniform in all zones of the convoluted package.

A concomitant object of the present invention is to provide an automatic winding apparatus for multi-layer condensers and electrodes which is capable of introducing the convoluted package into a cartridge and also of withdrawing the core from the fully assembled product.

Still another object of the present invention is to provide a condenser or electrode whose cartridge is completely or at least nearly completely filled with a large number of uniformly convoluted laminations.

With the above objects in view, the invention resides in the provision of a method which comprises the steps of winding a multi-layer structure consisting of a cathode layer, an anode layer, and an intermediate layer, e.g. a dielectric, onto a revolving slotted mandrel and simultaneously maintaining the outermost convolution under controlled pressure generated by at least one but preferably two spaced tensioning and stretching elements, introducing the mandrel with the convoluted package into a cartridge, and withdrawing the mandrel from the cartridge to permit slight expansion of convolutions which then completely fill the interior of the cartridge.

The novel winding apparatus comprises means for rotatably and axially shiftably supporting a diametrally slotted mandrel, means for supporting and for reciprocating an empty cartridge toward and away from the mandrel, and means for maintaining the convolutions of a multi-layer condenser or electrode under preferably uniform tension during the entire winding operation. Means may be provided for subjecting the completely assembled product to a voltmeter or ohmmeter test in order to determine whether or not the anode and cathode layers were damaged or short-circuited during the formation of convolutions and/or during the insertion of a convoluted package into the cartridge. The free end of a multi-layer strip of which the condenser or electrode package is formed is inserted into the slot of the mandrel, and the mandrel is caused to rotate at a predetermined and preferably constant speed to thereby form a requisite number of convolutions, the outermost convolution being always subjected to controlled pressure by two spaced rollers at least one of which is preferably controlled by a hydraulic or pneumatic motor. Means is provided for preventing any shifting of convolutions in the axial direction of the mandrel, and also for guiding the composite strip toward the slotted mandrel. In its preferred form, the winding apparatus further comprises means for automatically feeding empty cartridges to the winding station.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Figure 3:
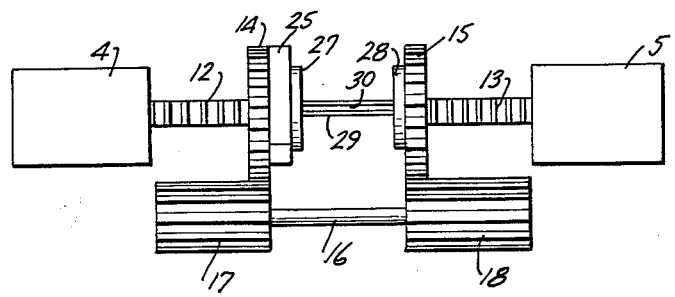
FIG. 3 is a schematic elevational view of certain component parts of the winding apparatus in a position they assume prior to insertion of a multi-layer strip into the slotted mandrel.
Figure 4:
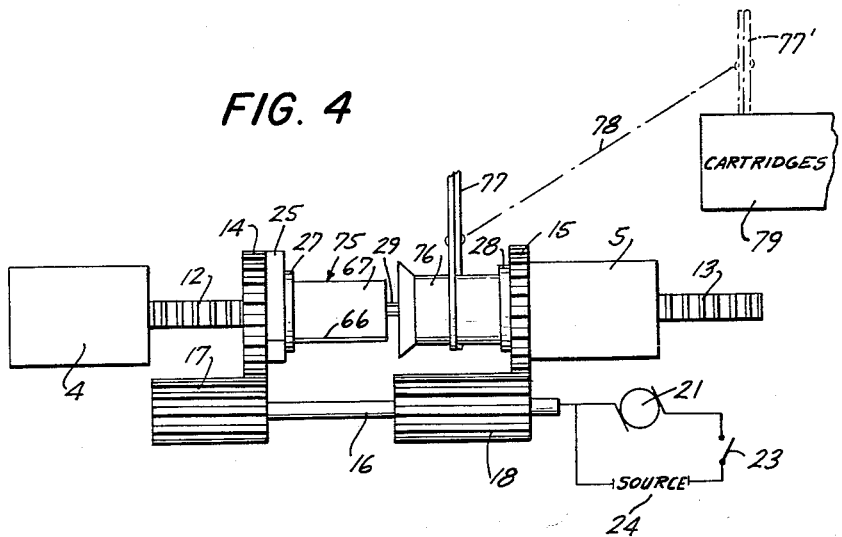
Figure 5:
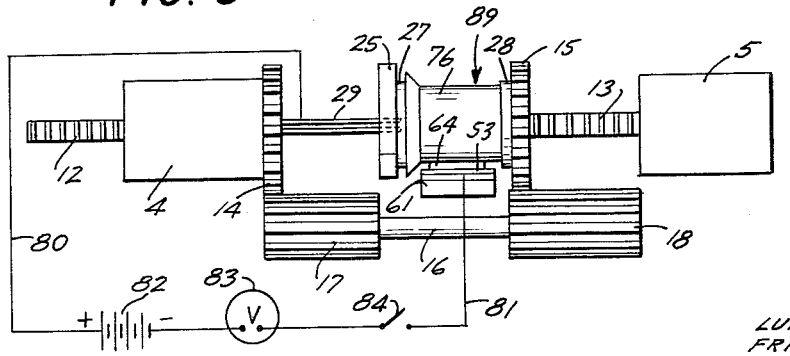

FIG. 4 is a similar schematic view showing certain parts of the apparatus in a position they assume prior to insertion of a completed package into the cartridge, further showing an automatic feeding arrangement which delivers empty cartridges to the winding station; and FIG. 5 illustrates the parts of FIGS. 3 and 4 in a position they assume prior to removal of a finished condenser or electrode from the winding apparatus, further showing a testing circuit for the finished product.

Figure 1:
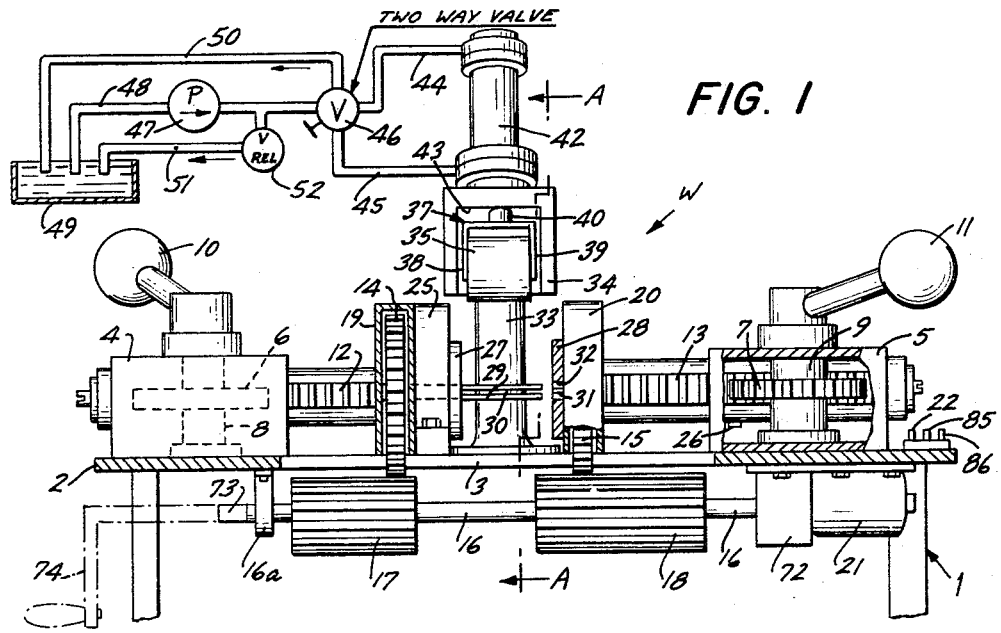
FIG. 1 is a partly elevational and partly sectional view of the winding apparatus with the guide rail for the multi-layer strip and the lower tensioning roller omitted, the apparatus being shown in idle position before the start of a winding operation.

Referring now in greater detail to the illustrated embodiment, and first to FIG. 1, there is shown a winding apparatus W which comprises a main support in the form of a table or bench 1 having a supporting plate 2 formed with an elongated preferably central cutout or opening 3. At the opposing longitudinal ends of the opening 3, the upper side of the plate 2 supports two aligned box-shaped frames 4, 5 for two pinions 6, 7, respectively. These pinions are mounted on shafts 8, 9 which may be rotated by handgrip members here shown as two substantially radial levers 10, 11, respectively. The teeth of pinions 6, 7 are in permanent mesh with aligned racks 12, 13, these racks being slidably guided and supported by the frames 4, 5, respectively. The right-hand end of the rack 12 rotatably mounts a gear 14 which extends through the opening 3 and meshes with a gear member 17 of considerable length. A similar gear member 18 meshes with a second gear 15 which is rotatably supported by the left-hand end of the rack 13. The gears 14, 15 are respectively received in two protecting covers 19, 20 of sheet metal or the like. These covers are secured to and are reciprocable by the toothed racks 12, 13 to prevent an operator from coming into direct contact with the gears. The pinions and racks 6, 12 and 7, 13 constitute means for reciprocating the gears 14, 15 toward and away from each other longitudinally of the gear members 17, 18, the length of these gear members being such that they remain in permanent mesh with the respective gears.

The gear members 17, 18 are non-rotatably secured to a coaxial drive shaft 16 whose left-hand end is rotatably supported in a journal bearing 16a carried by the underside of the plate 2. The right-hand end of the shaft 16 is driven by an electric motor 21 also mounted at the underside of the plate 2. The motor 21 may be started by a pushbutton 22 which controls a switch 23 (see FIG. 4) in the circuit of the motor 21, this circuit further including a suitable source of electrical energy 24. The drive means including the gear members 17, 18 the shaft 16 and the motor 21 rotates the gears 14, 15 at the same speed and simultaneously prevents any angular displacements of these gears with respect to each other. Thus, the reciprocating means 6, 12 and 7, 13 and the drive means 16–18, 21 may bring about axial displacements of gears 14, 15 toward and away from each other, as well as rotational movements of these gears always in the same direction and always at the same rate of speed. The left-hand gear 14 may be shifted between a stationary bearing block 25 which is mounted at the upper side of the plate 2 and the right-hand wall of the frame 4, the parts 4, 25 constituting two stops to locate the gear in its left-hand and right-hand end positions, respectively. The gear 15 is also movable between two end positions determined by a first stop constituted by the left-hand wall of the frame 5 and by a second stop in the form of a projection 26 carried by the toothed rack 13 and adapted to abut against the frame 5 when the gear 15 reaches its left-hand end position.

The gear 15 is drivingly connected with a coaxial guide disc 28 whose exposed left-hand guide face is turned toward a similar guide disc 27 mounted on the bearing block 25. The disc 27 may be rotated by a slotted mandrel 29 which is coaxially connected to and is reciprocable as well as rotatable with the left-hand gear 14. The mandrel 29 is formed with an elongated open diametral slot 30 which is adapted to receive a flat tongue or entraining means 31 provided in the right-hand guide disc 28. The latter is formed with a recess 32 surrounding the tongue 31 and adapted to receive the free end or tip of the mandrel 29 so that, if the gear 15 is moved all the way into the left-hand end position of FIG. 3, the mandrel is simultaneously driven by both gears and is held against twisting by the tongue 31 which then extends into the slot 30.

The plate 2 mounts an arcuate carrier in the form of an arm 33 whose upper end is shaped as a recessed head 34 adapted to receive a tensioning roller 35. The latter is freely rotatable on a shaft 36 which is mounted in the parallel legs 38, 39 of an inverted U-shaped bracket 37. This bracket is secured to the lower end of a piston rod 40 which is axially reciprocable by a piston 41 (see FIG. 2) received in a double-acting fluid cylinder 42 mounted on the head 34 of the carrier 33. The fluid motor 41, 42 is adapted to reciprocate the roller 35 between the positions of FIGS. 1 and 2, i.e. the roller may be withdrawn into or expelled from the downwardly opening recess 43 in the head 34. As is shown in FIG. 1, the cylinder 42 is connected with the ends of two fluid lines 44, 45 which communicate with its chambers at the opposing sides of the piston 41. The lines 44, 45 are connected to a two-way valve 46 which is adapted to reverse the flow of a pressure fluid delivered by a hydraulic pump 47 in the supply line 48. The line 48 receives fluid from a source here shown as a reservoir 49; this reservoir also communicates with the outlet end of a discharge or return line 50 which is connected to the valve 46. An overflow line 51 connects the pressure side of the pump 47 with the reservoir 49 and contains a pressure relief valve 52. It is assumed in FIG. 1 that the valve 46 connects the lines 45, 48 and 44, 50, respectively so that the pressure fluid filling the cylinder chamber below the piston 41 causes the rod 40 to withdraw the tensioning roller 35 into the recess 43, i.e. away from the mandrel 29. The position of valve 46 is reversed when the operator desires to move the tensioning roller 35 into the position of FIG. 2, i.e. the supply line 48 then communicates with the line 44 and the fluid moves the piston 41 in downward direction while the fluid in the lower cylinder chamber is free to flow from line 45 into the return line 50 and back to the source 49. It will be noted that the axis of the shaft 36 is parallel with the axes of the drive shaft 16 and of the mandrel 29.

Of course, the pump 47 may be replaced by an air compressor and the reservoir 49 omitted. Also, it is possible to provide a constant-pressure outlet valve in the line 44 to further insure that the roller 35 remains under constant tension when the winding apparatus is put to use.

Figure 2A:
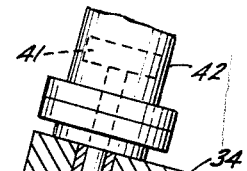
FIG. 2a is an enlarged transverse section taken along the line B—B of FIG. 2, as seen in the direction of arrows, showing the layers of a strip which forms the convolutions of a condenser or electrode.
Figure 2:
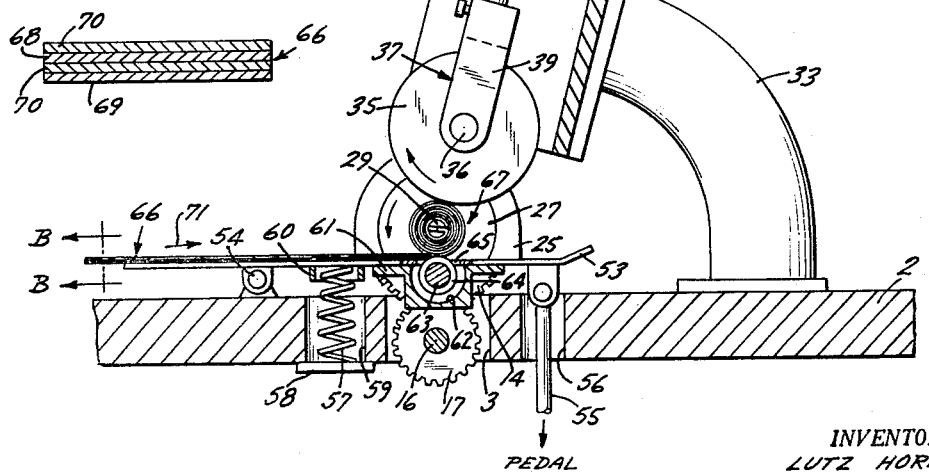
FIG. 2 is a transverse section taken along the line A—A of FIG. 1, as seen in the direction of arrows, showing the apparatus in actual operation with a partly completed package on the mandrel and with both tensioning rollers in operative position.

Referring now to FIG. 2, there is shown a conveyor in the form of a guide rail 53 which is articulately fixed to the upper side of the plate 2, as at 54, and whose end extending rearwardly and beyond the space between the guide discs 27, 28 is articulately fixed to a push rod 55 extending through a bore 56 provided in the plate 2. The guide rail is constantly biased in anticlockwise direction with respect to the axis of the pivot pin 54 by a resilient element here shown as a helical spring 57 whose upper end bears against the underside of the rail 53. The lower end of this spring bears against a removable bottom plate member 58 secured to the underside of the plate 2 to seal a bore 59 which accommodates the spring. The upper end of the spring extends into an inverted cup 60 secured to the underside of the guide rail 53.

Directly above the opening 3 in the plate 2, the underside of the guide rail 53 carries a bearing element 61 which is formed with a cylindrical cutout 62 and rotatably mounts a pivot axle or shaft 63 for a second or lower tensioning roller 64. The upper portion of this roller 64 extends through an aperture 65 formed in the guide rail 53 directly below the slotted mandrel 29.

The multi-layer structure or composite strip 66 which is to form the convolutions 67 on the mandrel 29 is shown in FIG. 2a. It comprises a positive metallic layer 68, a negative metallic layer 69, and a separator or intermediate layer 70, the latter often consisting of a dielectric material. As is clearly illustrated in FIG. 2, the forward end of the strip 66 is inserted into the slot 30 of the mandrel 29 in such a manner that its forward edge does not project from the mandrel to insure that the first convolutions formed on the mandrel are neither damaged nor distorted when the gears 14, 15 are caused to rotate. The strip 66 is guided along the upper side of the rail 53 (arrow 71) and may be paid out by a supply reel, not shown.

The operation of the winding apparatus will now be described with reference to FIGS. 3–5 showing diagrammatically certain component parts of the assembly, and also with reference to FIG. 2 which shows the apparatus in actual operation with a partly completed package consisting of convolutions 67 formed on the mandrel 29.

Referring first to FIG. 3, the parts illustrated therein assume their respective positions before the winding operation is started. The gears 14, 15 are in their respective right-hand and left-hand end positions so that the distance between the exposed guide faces of discs 27, 28 equals the width of the multi-layer strip 66. The tip of the mandrel 29 extends into the recess 32 and is drivingly engaged by the entraining means 31 of the guide disc 28. The forward end portion of the strip 66 is then inserted into the slot 30 in the manner as shown in FIG. 2, and the motor 21 is started by depressing the actuating member 22 so that the motor switch 23 may complete the circuit of the current source 24. Alternately, the strip 66 may be inserted into the slot 30 while the gear 15 is still in the right-hand end position of FIG. 4. This is often more convenient because the strip need not be introduced at right angles to the axis of the mandrel 29 but may be introduced substantially axially, i.e. in a direction from the tip of the mandrel toward the guide disc 27.

During the formation of convolutions 67, the tensioning rollers 35, 64 bear against spaced points of the outermost convolution under the action of fluid in the upper chamber of cylinder 42 and under the bias of the resilient element 57, respectively. The strip 66 need not be fed toward the winding station because the rotating mandrel 29 by itself will cause it to advance in the direction of the arrow 71 toward the winding station. The rollers 35, 64 maintain the convolutions under constant and uniform tension thus insuring that a comparatively small package contains a large number of convolutions. The scale at which the mandrel 29 is shown in the drawings is greatly exaggerated for the sake of clarity; in actual use, the diameter of the mandrel is very small so that the convolutions 67 need expand only slightly to fill the space formed when the mandrel is withdrawn from the completed package after the package is inserted into a cartridge in the manner which will be described in connection with FIGS. 4 and 5. The guide rail 53 is not in contact with the convolutions 67 which reduces friction because the roller 64 is freely rotatable on its shaft 63.

Referring back to FIG. 2, it will be noted that the width of the opening 3 in the plate 2 is such that this opening may readily accommodate the major part of the bearing element 61 during the formation of convolutions 67, i.e. while the guide rail is caused to pivot about the pin 54 and against the bias of the resilient element 57. The upper tensioning roller 35 also moves upwardly and away from the mandrel 29. During the winding operation, the tensioning rollers 35, 64 rotate about their respective shafts 36, 63 merely by friction, i.e. owing to their engagement with the negative metallic layer 69. It will be noted that the axes of shafts 36, 63 and of the mandrel 29 are not in a common plane; such arrangement is preferred because the tensioning rollers 35, 64 then cannot deform the convolutions 67. The angle enclosed by the common axial planes of parts 35, 29 and 29, 64 is preferably slightly less than 180°. In other words, the line of contact between roller 64 and the outer side of the layer 69 is spaced somewhat less than 180° from the line of contact between the layer 69 and the upper tensioning roller 35. Such positioning of the tensioning rollers brings about a certain stretching of the strip 66 during the latter's transformation into the convolutions 67.

As is shown in FIG. 1, the shaft 16 of the elongated gear members 17, 18 may be driven through a schematically illustrated transmission of the infinitely variable type. This transmission is shown installed in a gear box 72 which preferably also contains a suitable clutch device to permit disconnection of the shaft 16 from the motor 21. If desired, the shaft 16 may be rotated by hand, for example, by connecting its non-circular left-hand end 73 with a hand crank 74 which is shown in phantom lines.

By proper selection or setting of the relief valve 52, the pressure at which the upper tensioning roller 35 bears against the outermost convolution 67 may remain constant during the entire winding operation. The pressure of the lower tensioning roller 64, too, will vary very little so that each convolution is formed under identical or nearly identical conditions thus insuring complete uniformity of the package 75 which is formed on the mandrel 29. The exposed faces of the guide discs 27, 28 prevent any lateral displacements of the convolutions so that the axial length of the package formed on the mandrel corresponds exactly to the width of the strip 66. Since both ends of the mandrel 29 are positively driven, and since the movements of gears 14, 15 are fully synchronized, the package cannot be twisted or otherwise deformed during the winding operation. If desired, means (not shown) may be provided for automatically arresting the motor 21 when the package 75 formed on the mandrel 29 reaches the desired diameter. Alternately, the strips 66 may be cut to requisite length so that the operation is automatically completed as soon as the strip of a predetermined length is fully convoluted onto the mandrel.

Referring now to FIG. 4, there is shown a complete package 75 just prior to insertion into a cupped cartridge or shell 76. The upper tensioning roller 35 is moved away from the outermost convolution 67 by reversing the valve 46 in the manner as described above. Upon withdrawal of the upper roller, the bias of spring 57 which presses the lower roller 64 against the package 75 is sufficient to prevent the strip from unwinding. The gear 15 is then shifted into its right-hand end position into abutment with the frame 5 so as to provide room for the insertion of an empty cartridge whose closed end abuts against the guide disc 28. The cartridge 76 may be inserted and held in requisite position by hand, but it is preferred to provide an automatic feeding arrangement which is shown only schematically because its exact construction forms no part of the present invention. For example, the feeding mechanism may comprise suitable gripper means 77 which is movable between its full line position and the phantom-line position 77' by a schematically indicated overhead conveyor 78 or the like. When in the position 77', the gripper means may pick an empty cartridge from a container 79. It is often preferred to mount the main supporting means 1 for pivotal movements about a vertical axis so that it can be turned through say 45° when the gripper means 77 delivers an empty cartridge 76 into the position of FIG. 4. While the mandrel 29 remains in the position of FIG. 4, the right-hand gear 15 is caused to move in a direction to the left so as to shift the cartridge 76 into the position of FIG. 5 in which the package 75 is fully received therewithin. Once the package is partially received in the cartridge, the pedal at the lower end of the push rod 55 (see FIG. 2) is depressed to move the guide rail 53 and the lower tensioning roller 64 away from the outermost convolution 67 in order to permit unimpeded advance of the cartridge in a direction to the left. The gear 14 is then shifted in a direction to the left (see FIG. 5) to withdraw the tip of the mandrel 29 into the guide disc 27, whereupon the loaded cartridge 76 may be readily withdrawn after moving the right-hand gear 15 toward the frame 5. The apparatus W is now ready to begin the next winding operation.

As is shown in FIG. 5, the bare portion of the drive shaft 16 is located directly beneath the bearing element 61 so that the guide rail 53 and the tensioning roller 64 may be moved away from the mandrel a distance sufficient to permit unimpeded movements of the cartridge in a direction to the left, that is, between the positions of FIGS. 4 and 5.

By way of example, the diameter of the mandrel 29 may be in the range of one-fifth of an inch, and the diameter of the condenser or electrode 89 consisting of the package 75 and cartridge 76 is then in the range of about one and one-fifth of an inch. Once the mandrel is withdrawn, the convolutions in the cartridge 76 will unwind to completely fill the space previously occupied by the mandrel. Thus, a condenser or electrode assembled in our improved winding apparatus is actually of the coreless type in contrast to the presently known products which retain a core even after insertion of the package into a cartridge. Regardless of the exact diameter of a permanently installed core, the core always occupies space which should be occupied by the convolutions.

The axial length of the driving gear member 17 equals the combined axial length of the mandrel 29 and left-hand gear 14. The axial length of the other gear member 18 must exceed at least slightly the combined axial length of the gear 15 and of a cartridge 76.

FIG. 5 shows a second electric circuit comprising two leads 80, 81 which are connected to the mandrel 29 and to the spring 57 or to the lower tensioning roller 64, respectively. This circuit includes a source of direct current, e.g. a battery 82, a voltmeter 83, a voltmeter switch 84, and an actuating member in the form of a pushbutton 85. The pushbutton 85 is mounted on a control panel which also mounts the pushbutton 22 for the motor switch 23 (see FIG. 1). Adjacent to the members 22, 85, there is provided a third pushbutton 86 which is utilized in connection with a conventional ohmmeter (not shown) for testing the capacity and resistivity of condensers in a manner well known in the art.

The circuit of the instrument 83 and of the non-illustrated ohmmeter is utilized for testing the final product 89. The lead 80 is connected to the positive pole of the battery 82 whose negative pole is connected to the rail 53 and to the lower tensioning roller 64. When the roller 64 is moved into contact with the cartridge 76 and the pushbutton 85 is depressed to close the switch 84, the voltmeter 83 should indicate no voltage. If deflection on the scale of the voltmeter is observable, the fully assembled condenser or electrode 89 is defective, e.g. because of a short between the layers or laminae 68, 69. The provision of a testing circuit is particularly important when the finished product 89 is an electrode for a storage cell or the like because the laminae 68, 69 are then coated with an electrolyte in the form of a damp paste which is still wet, when the package 75 is formed. The inner resistance of an electric cell may be measured in similar fashion.

The capacity of a condenser may be read on the scale of the ohmmeter upon depression of the pushbutton 86 to close a switch, not shown.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for winding and assembling of condensers and electrodes which comprises, in combination, support means; a mandrel having an elongated slot open at one end of said mandrel and adapted to receive the end of a strip; a first rotary guide member mounted on said support means and coaxial with said mandrel; a second rotary guide member coaxial with and spaced from said first guide member, said mandrel reciprocable through said first guide member and having its open end engageable with said second guide member; driving means adapted to rotate said mandrel and said guide members at the same speed for thereby winding said strip on said mandrel, said driving means comprising an electric motor mounted on said support means, a drive shaft parallel with said mandrel, infinitely variable transmission means drivingly connecting said motor with said shaft, a first and a second gear member mounted on and rotatable with said shaft, a first gear drivingly connected and reciprocable with said mandrel, said first gear in permanent mesh with said first gear member, and a second gear drivingly connected and reciprocable with said second guide member, said second gear in permanent mesh with said second gear member; rack and pinion means mounted on said support means for reciprocating the second guide member toward and away from said first guide member; a first and a second tensioning roller each having an axis of rotation parallel with the axis of said mandrel; means mounted on said support means for biasing said rollers in a direction toward said mandrel; and actuating means mounted on said support means and including rack and pinion means for advancing said mandrel axially in the direction toward said second guide member with its open end leading prior to a winding operation and for withdrawing said mandrel axially in the opposite direction with its open end trailing upon completion of a winding operation so that the wound strip will be removed from said mandrel with the aid of said open end thereof.

2. An apparatus for winding and assembling of condensers and electrodes which comprises, in combination, support means; a mandrel having an elongated slot open at one end of said mandrel and adapted to receive the end of a strip; a first rotary guide member mounted on said support means and coaxial with said mandrel; a second rotary guide member coaxial with and spaced from said first guide member, said mandrel reciprocable through said first guide member and having its open end engageable with said second guide member; means including electric motor means operatively coupled with and adapted to rotate said mandrel and said guide members at the same speed for thereby winding said strip on said mandrel; means mounted on said support means for reciprocating the second guide member toward and away from said first guide member; a first tensioning roller located above and having an axis parallel with the axis of said mandrel; carrier means mounted on said support means and mounting said roller for movements toward and away from said mandrel; a fluid motor for reciprocating said roller; means for controlling said fluid motor and for thereby biasing said roller with a given force in a direction toward said mandrel; a second tensioning roller having an axis parallel with and located below said mandrel; means mounted on said support means and including a guide rail and resilient means for biasing said second roller in a direction toward said mandrel; and actuating means mounted on said support means for advancing said mandrel axially in the direction toward said second guide member with its open end leading prior to a winding operation and for withdrawing said mandrel axially in the opposite direction with its open end trailing upon completion of a winding operation so that the wound strip will be removed from said mandrel with the aid of said open end thereof.

3. An apparatus for winding and assembling of condensers and electrodes which comprises, in combination, support means; a mandrel having an elongated slot open at one end of said mandrel and adapted to receive the end of a strip; a first rotary guide member mounted on said support means and coaxial with said mandrel; a second rotary guide member coaxial with and spaced from said first guide member, said mandrel reciprocable through said first guide member and having its open end engageable with said second guide member; means including electric motor means operatively coupled with and adapted to rotate said mandrel and said guide members at the same speed for thereby winding said strip on said mandrel; means mounted on said support means for reciprocating the second guide member toward and away from said first guide member; a first tensioning roller located above and having an axis parallel with the axis of said mandrel; means for reciprocating the roller toward and away from said mandrel; means connected with said last mentioned reciprocating means and including fluid motor means for biasing said roller toward said mandrel; a second tensioning roller having an axis parallel with the axis of said mandrel, the axes of said mandrel and said first and second rollers, respectively, disposed in two mutually inclined planes; an elongated guide rail rotatably mounting said second roller and articulately fixed to said support means, said guide rail extending substantially at right angles with respect to the axis of said mandrel; resilient means constantly biasing said guide rail in a direction to move said second roller toward said mandrel; means for moving said guide rail against the bias of said resilient means; and actuating means mounted on said support means for advancing said mandrel axially in the direction toward said second guide member with its open end leading prior to a winding operation and for withdrawing said mandrel axially in the opposite direction with its open end trailing upon completion of a winding operation so that the wound strip will be removed from said mandrel with the aid of said open end thereof.

References Cited in the file of this patent

UNITED STATES PATENTS

| | | |
|---|---|---|
| 515,200 | Disher | Feb. 20, 1894 |
| 850,166 | Lanphier | Apr. 16, 1907 |
| 1,047,422 | Loewy | Dec. 17, 1912 |
| 1,385,379 | Kratz | July 26, 1921 |
| 1,789,451 | Rosaire et al. | Jan. 20, 1931 |
| 2,531,389 | Brandt | Nov. 28, 1950 |
| 2,572,312 | Burge et al. | Oct. 23, 1951 |
| 2,731,183 | Shaw | Jan. 17, 1956 |
| 2,769,228 | Burge | Nov. 6, 1956 |
| 2,836,372 | Roberts | May 27, 1958 |
| 2,925,228 | Hayner et al. | Feb. 16, 1960 |
| 2,950,070 | Thorson et al. | Aug. 23, 1960 |